Nov. 9, 1943.　　　　J. W. SCOTT　　　　2,333,825
RED WINDOW COVER AND FILM INDICATOR FOR CAMERAS
Filed Jan. 31, 1940　　　2 Sheets-Sheet 1
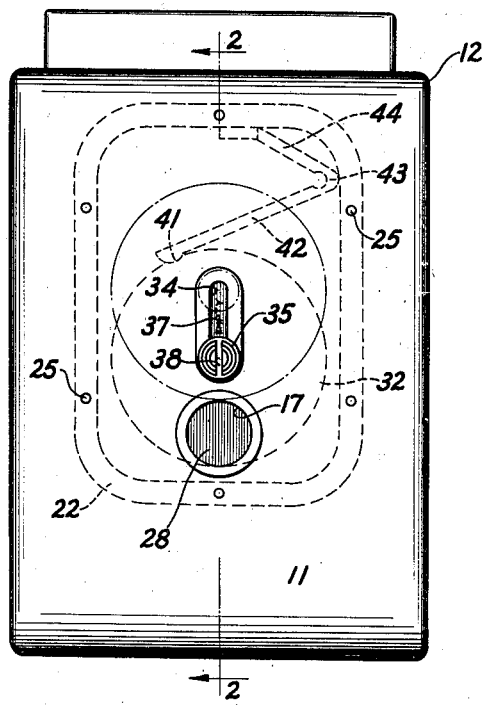
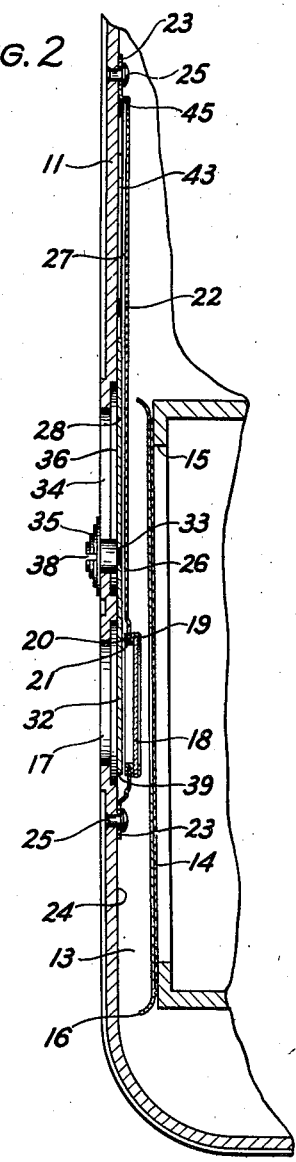
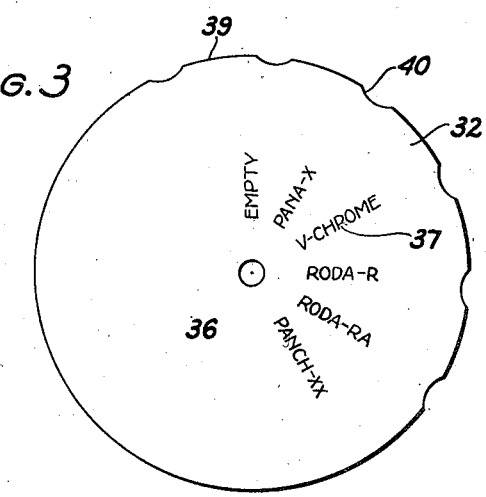
JOHN W. SCOTT
INVENTOR
BY Newton M. Perrins
J. Griffin Little
ATTORNEYS Nov. 9, 1943.    J. W. SCOTT    2,333,825
RED WINDOW COVER AND FILM INDICATOR FOR CAMERAS
Filed Jan. 31, 1940    2 Sheets-Sheet 2

JOHN W. SCOTT
INVENTOR
BY
ATTORNEYS

Patented Nov. 9, 1943

2,333,825

UNITED STATES PATENT OFFICE 2,333,825

RED WINDOW COVER AND FILM INDICATOR FOR CAMERAS

John W. Scott, Rochester, N. Y., assignor to Eastman Kodak Company, Rochester, N. Y., a corporation of New Jersey Application January 31, 1940, Serial No. 316,603

6 Claims. (Cl. 40—70)

The present invention relates to photographic cameras, and more particularly to a red window cover and film indicator for such cameras.

One object of the invention is the provision of a member which is arranged to cover and to afford a light shield for the red window in the camera back to prevent the admission of light therethrough during the period when the examination of the exposure numbers is not required, yet which may be readily and easily moved to uncover the window to permit viewing of the exposure numbers during the film winding operation.

Another object of the invention is the provision of a member which is turnably mounted in the camera and provided with a series of film indications which may be selectively brought into registry with an aperture formed in the camera housing so as to be visible therethrough to designate the type of film with which the camera is loaded.

A further object of the invention is the provision of a red window cover and film indicator which is simple in construction, relatively inexpensive to manufacture, easy to manipulate and adjust, and highly effective in use.

To these and other ends, the invention resides in certain improvements and combinations of parts all as will be hereinafter more fully described, the novel features being pointed out in the claims at the end of the specification.

In the drawings:

Fig. 1 is a rear view of a camera of the roll film type showing the relation thereto and the manner of mounting thereon a red window cover and film indicator constructed in accordance with the present invention;

Fig. 2 is a vertical sectional view of the camera taken substantially on lines 2—2 of Fig. 1, but on a larger scale than the latter, showing the relation of the single red window cover and film indicator to the other camera parts;

Fig. 3 is a view of the red window cover and film indicator detached from the camera housing;

Similar reference numerals throughout the various views indicate the same parts.

Figure 4:
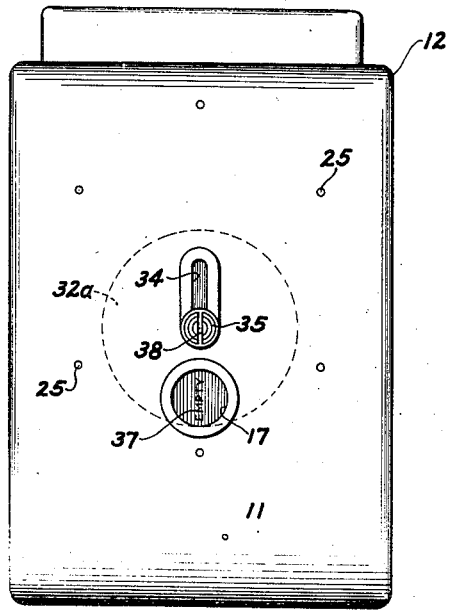
Fig. 4 is a view similar to Fig. 1, but showing a modified arrangement of the film indicator.

The present invention relates to a combined red window cover and film indicating device, to be later described, which is both slidably and turnably mounted on the back or closure 11 of the body portion 12 of a photographic camera of the roll film type. The back is removably or hingably secured to the body portion, as is well known to those in the art, and cooperates therewith to provide a film chamber 13 through which a film strip 14 is moved in the usual well-known manner. During the exposure, the strip 14 is yieldably held in flat position over the exposure aperture 15 by means of a pressure plate 16 which is spring mounted on the back 11 in any suitable and well-known manner. The back 11 is provided with a circular or other shaped opening 17 through which exposure numbers on the film backing strip may be viewed. This viewing aperture 17 is usually covered with a red or suitable colored non-actinic glass to prevent fogging of the strip, and may thus be broadly designated as a "red window" through which the numbers on the film backing strip may be viewed.

In the present embodiment, however, the color glass 18 is preferably mounted in a frame 19 which has the edges 20 thereof bent or flared over the edge of a suitably shaped opening 21 formed in a cover plate 22 the marginal edges 23 of which are secured to the inner surface 24 of the back 11 by rivets 25, or other suitable fastening means. The intermediate portion 26 of the cover plate 22 is preferably spaced from the surface 24 to provide a shallow compartment 27 which houses the red window cover and film indicating device, broadly indicated by the numeral 28.

This red window cover is, in the present embodiment, preferably in the form of a thin flat circular disk 32 which is positioned in the compartment 27 and is slidably mounted so that it may be moved to a position to cover the opening 17 and to thus afford a light shield therefor so as to prevent light rays from passing through the opening 17 and fogging the film positioned in the chamber 13. Such fogging occurs when certain types of film are used, as is well known in the art. This cover position of disk 32 is shown in dotted lines of Fig. 1. After an exposure is made, the exposed film area is wound up on a takeup roll, not shown. During this winding operation, it is necessary to view the exposure numbers on the film backing strip so as to insure proper positioning of the film strip for the next exposure.

In order to permit such exposure numbering to be viewed through the viewing opening 17 and colored glass 18, the disk 32 must be slid or moved to an inoperative position such as indicated in broken line, Fig. 1, so as to uncover the red window opening. The disk 32 may be thus slid into and out of window covering position. It is apparent that the color glass 18 may be mounted directly on the back 11 to cover the opening 17, as is the usual practice, but it is preferred to mount the glass on the plate 22 so that the disk 32 will be positioned between the back 11 and the glass 18 for a reason to be later described. In order to thus slidably mount the disk 32, the latter has secured thereto, substantially at the center thereof, a stud 33 which extends upwardly through an elongated slot or aperture 34 formed in the back 11 adjacent the viewing opening 17, as clearly shown in Figs. 1 and 2. The outer end of the stud 33 is formed with an enlarged portion or knob 35 which may be grasped to slide the stud 33 longitudinally of the slot 34 to move the disk 32 into and out of window covering position, as indicated by dotted and broken lines in Fig. 1.

As is well known, various types of film require different exposure conditions to insure best results. Very often, however, relatively long intervals of time may elapse between the making of the successive exposure, and during this time the operator may forget the precise type of film with which the camera is loaded. Obviously under such conditions, the desired results cannot be obtained. In order to overcome this undesirable feature, the present invention provides a film indicating device which clearly shows the type of film in the camera. This device is adjusted when the film is placed in the camera, and regardless of the lapse of time, the operator can definitely determine upon inspection of the device the particular film with which the camera is loaded, thus effectively eliminating any guesswork on the part of the operator. To secure this highly desirable result, the disk 32 has one face 36 thereof printed, etched, engraved, or otherwise formed with a series of indications 37 to designate various types of film. Obviously any reasonable number of these designations may be utilized to suit the particular type of film which may be used with the camera.

Figure 5:
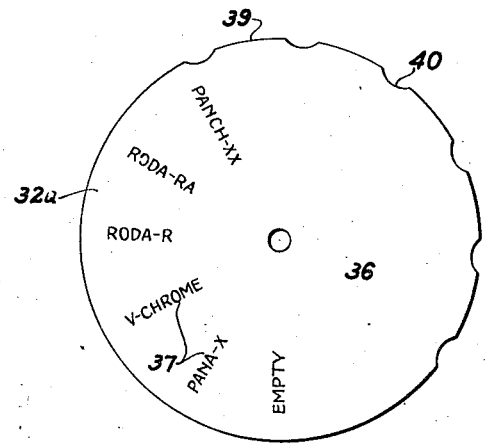
Fig. 5 is a view of a modified red window cover and film indicator.

These films designations are, in the present embodiment, positioned on the disk 32 so as to register with the elongated slot 34 when the disk is in window covering position, as shown in dotted line, Fig. 1. As an alternative arrangement, however, these indications may, if desired, be so positioned on a disk 32ᵃ as to register with the viewing aperture 17 rather than with the slot 34, as clearly shown in Fig. 4. The modified film indicating disk 32ᵃ is best shown in Fig. 5, and parts thereof corresponding to the disk shown in Fig. 3 are designated by the same numerals. It is for this reason that the disk 32 is positioned ahead of the glass 18. The important point is that when the disk 32 is in its normal window-covering position, one, and only one, of these film indications 37 will be visible through either the viewing aperture 17 or the elongated slot 34 so as to clearly and definitely indicate to the operator the type of film in the camera. If, however, the camera is not loaded the "empty" designation is moved into viewing position, as shown in Fig. 1.

When the camera is loaded with film, the disk 32 is turned by turning the knob 35 to bring the proper film designation 37 into registry with the slot 34 or the viewing aperture 17, as the case may be. To facilitate such turning, the knob 35 is preferably slotted at 38 to receive a coin, knife, or other suitable article which may be inserted in the slot to turn the knob 35 and hence the disk 32. The stud 33 may be made to form a tight fit in the slot 34 so as to afford sufficient friction therewith to retain the disk 32 in its adjusted film indicating position. It is preferred, however, to provide means for positively retaining the disk 32 in its adjusted position.

To this end, the periphery 39 of the disk 32 is formed with a series of notches 40 which are arranged to selectively receive a correspondingly shaped portion 41 formed on the end of one arm 42 of a hairpin spring 43 of the shape best shown in Fig. 1. The other arm 44 of the spring 43 is arranged to engage the shoulder 45 formed between the upper edge 23 and the bent-out intermediate portion 26 of the cover plate 22, as best shown in Fig. 2. This spring and notch arrangement provides a simple yet highly effective arrangement for positively and resiliently retaining the disk 32 in its adjusted position, yet permitting easy turning of the disk to a new position of adjustment when desired. The spring 43 also serves to yieldably retain the disk 32 in its lower position, Fig. 1, to cover and afford a light shield for the viewing aperture 17. When the disk is slid to uncover the red window aperture 17 during the film winding operation, the spring 43 is compressed or tensioned, as is apparent. After the film winding operation is completed, the knob 35 is released and the tensioned spring 43 then automatically slides the disk 32 to its window covering position.

It is apparent that the above-described disk is slidably mounted on the camera back and is movable into and out of position to cover the red window or viewing aperture 17 to afford a light shield therefor so as to prevent fogging of the film. The disk may also be turned to bring the proper film designation into registry with the slot 34 or the red window aperture 17. While the disk is thus both slidably and turnably mounted in the compartment 27, the latter is closed by the cover plate 32 which is positioned in the film chamber 13. Therefore, the disk 32 may be broadly considered as being positioned in the film chamber 13 adjacent the path of the film strip 14. Furthermore, while the disk 32 has been shown as circular, obviously various other shapes may be used without departing from the invention.

While one embodiment of the invention has been disclosed, it is apparent that the inventive idea may be carried out in a number of ways. The present application is therefore not to be limited to the precise details disclosed but is intended to cover all variations and modifications thereof which fall within the spirit of the invention or the scope of the appended claims.

I claim:

1. In a photographic camera, the combination with a body portion formed with a film chamber and provided with a wall for closing said chamber and having an aperture formed therein, of a member positioned in said chamber and adapted to be moved to and from position to cover said aperture to afford a light shield therefor, said member being provided with film designations arranged to be selectively brought into registry with said aperture so as to be visible therethrough to designate the type of film in said chamber, means secured to said member and extending exteriorly of said wall for adjusting said member to position the desired designation in registry with said aperture and for moving said member to and from aperture covering position, and means to positively retain said member in adjusted film designating and aperture covering position.

2. In a photographic camera, the combination with a body portion formed with a film chamber and provided with a wall for closing said chamber and having an aperture formed therein, of a disk positioned in said chamber and adapted to be moved to and from position to cover said aperture to afford a light shield therefor, said disk being provided with film designations on one face thereof and formed with a series of peripheral notches, a stud secured to said member and extending through said wall for moving said member to and from aperture covering position, an adjusting portion formed on the outer end of said stud for moving said member relative to said wall and said aperture to selectively bring the proper designation into registry with said aperture, and a spring carried by said wall and having a portion thereof arranged to engage one of said notches to yieldably retain said disk in adjusted position.

3. In a photographic camera, the combination with a body portion having a film chamber and provided with a closure for said chamber, said closure being formed with a film viewing aperture, of a member positioned in said chamber and adapted to be moved to and from position to cover said aperture to afford a light shield therefor, mounting means secured to said member and extending through a second aperture in said closure to slidably and turnably mount said member thereon in a position to cover said second aperture, said member having one face thereof formed with a series of film designations arranged to be selectively brought into registry with one of said apertures so as to be visible therethrough to designate the types of film positioned in said chamber, and an operating portion on said mounting means for sliding said member into and out of position to cover said viewing aperture and for turning said member to bring one of said designations into registry with said one aperture.

4. In a photographic camera, the combination with a body portion having a film chamber and provided with a closure for said chamber, said closure being formed with a film viewing aperture, of a member positioned in said chamber and adapted to be moved to and from position to cover said aperture to afford a light shield therefor, mounting means secured to said member and extending through a second aperture in said closure to slidably and turnably mount said member thereon in a position to cover said second aperture, said member having one face thereof formed with a series of film designations arranged to be selectively brought into registry with one of said apertures so as to be visible therethrough to designate the type of film positioned in said chamber, an operating portion on said mounting means for sliding said member into and out of position to cover said viewing aperture and for turning said member to bring one of said designations into registry with said one aperture, and means yieldably engaging said member and tending to move the latter in a direction to cover said viewing aperture and to retain said member in the adjusted film designating position.

5. In a photographic camera, the combination with a body portion having a film chamber and provided with a closure for said chamber, said closure being formed with a film viewing aperture, of a disk positioned in said chamber adjacent a movable film strip, said closure being formed with an elongated aperture adjacent said viewing aperture, a stud secured to said disk and extending through said elongated aperture to both slidably and turnably mount said disk on said closure in a position to cover said elongated aperture, said disk having one face thereof formed with a series of film designations arranged to be selectively brought into registry with one of said apertures so as to be visible therethrough to designate the type of film positioned in said chamber, and a knob formed on the outer end of said stud for sliding the latter in said elongated slot to move said disk into and out of covering position for said viewing aperture and for rotating said stud in said elongated aperture to selectively turn said stud to bring the desired designation into registry with said one aperture.

6. In a photographic camera, the combination with a body portion having a film chamber and provided with a closure for said chamber, said closure being formed with a film viewing aperture, of a disk positioned in said chamber adjacent the path of said film therethrough, said closure being formed with an elongated aperture adjacent said viewing aperture, a stud secured to said disk and extending through said elongated aperture to both slidably and turnably mount said disk on said closure in a position to cover said elongated aperture, said disk having one face thereof formed with a series of film designations arranged to be selectively brought into registry with one of said apertures so as to be visible therethrough to designate the type of film positioned in said chamber, said disk also being formed with a series of peripheral notches, a knob formed on the outer end of said stud for sliding the latter in said elongated slot to move said disk into and out of covering position for said viewing aperture and for rotating said stud in said elongated slot to selectively turn said stud to bring the desired designation into registry with said one aperture, a spring mounted on said closure and engaging said disk and tending to move the latter to cover said viewing aperture to afford a light shield therefor, and a portion on said spring arranged to yieldably engage one of said notches to retain said disk in adjusted film designating position.

JOHN W. SCOTT.